(12) United States Patent
Minor

(10) Patent No.: US 7,912,320 B1
(45) Date of Patent: Mar. 22, 2011

(54) METHOD AND APPARATUS FOR PHOTOGRAPHIC MEASUREMENT

(76) Inventor: Paul Minor, Granada Hills, CA (US)

( * ) Notice: Subject to any disclaimer, the term of this patent is extended or adjusted under 35 U.S.C. 154(b) by 4 days.

(21) Appl. No.: 12/454,051

(22) Filed: May 11, 2009

Related U.S. Application Data

(63) Continuation-in-part of application No. 11/623,564, filed on Jan. 16, 2007, now abandoned.

(51) Int. Cl.
*G06K 9/36* (2006.01)

(52) U.S. Cl. .......................................... 382/286

(58) Field of Classification Search ............ 382/286, 382/287, 291, 294, 154, 106, 104, 278, 255; 348/36, 49, 135
See application file for complete search history.

(56) References Cited

U.S. PATENT DOCUMENTS

| | | | |
|---|---|---|---|
| 5,910,817 A | 6/1999 | Ohashi et al. | |
| 5,967,979 A | 10/1999 | Taylor et al. | |
| 6,097,850 A | 8/2000 | Watanabe et al. | |
| 6,618,498 B1 | 9/2003 | Nakayama | |
| 6,768,813 B1 | 7/2004 | Nakayama | |
| 6,975,361 B2 | 12/2005 | Kamon et al. | |
| 6,987,531 B2 | 1/2006 | Kamon | |
| 7,266,233 B2 | 9/2007 | Chang et al. | |
| 7,268,917 B2 | 9/2007 | Watanabe et al. | |
| 7,269,281 B2 | 9/2007 | Anei | |
| 7,293,368 B1 | 11/2007 | Faulk et al. | |
| 7,495,776 B2 * | 2/2009 | Kubo et al. ............... 356/601 |
| 2002/0093515 A1 | 7/2002 | Fay et al. | |
| 2004/0179729 A1 | 9/2004 | Imai et al. | |
| 2004/0184656 A1 * | 9/2004 | Anei ............... 382/154 |
| 2005/0177350 A1 | 8/2005 | Kishikawa | |
| 2005/0201638 A1 | 9/2005 | Cha | |
| 2006/0187333 A1 | 8/2006 | Kobayashi et al. | |
| 2007/0098251 A1 * | 5/2007 | Lu ............... 382/154 |

FOREIGN PATENT DOCUMENTS

JP 63214888 9/1988

* cited by examiner

*Primary Examiner* — Yon Couso
(74) *Attorney, Agent, or Firm* — Gene Scott; Patent Law & Venture Group

(57) ABSTRACT

A camera is capable of measuring distances to objects in a photographic field of view and when two such distances are measured and the included angle between their paths, a measurement standard and a vertical plane are defined. The standard is then used to measure linear dimensions of any objects within the defined vertical plane and field of view. The camera, itself, can be used, on site, to measure various objects in the field of view, or the information may be transmitted for use off site use.

5 Claims, 2 Drawing Sheets

METHOD AND APPARATUS FOR PHOTOGRAPHIC MEASUREMENT

CROSS-REFERENCE TO RELATED APPLICATIONS

This is a Continuation-In-Part application of U.S. patent application Ser. No. 11/623,564, filed Jan. 16, 2007, which is incorporated herein by reference.

BACKGROUND OF THE INVENTION

1. Field of the Present Disclosure

This disclosure relates generally to an apparatus and method for determining dimensions of objects using photographic technique.

2. Description of Related Art Including Information Disclosed Under 37 CFR 1.97 and 1.98

Kobayashi et al., US 20060187333 discloses an image pickup device which includes: image pickup means that opposes correctly to a photographic subject, and forms and picks up an image of the same; display means that displays an image data picked up by the image pickup means; distance measuring means that measures a distance to the photographic subject to be picked up by the image pickup means; index display means that displays an index on the display means so as to be superimposed on the image data; angle of inclination measuring means that measures an angle of inclination of the image pickup means when it is inclined so as to align the index displayed by the index display means with a desired portion to be measured; and actual dimension calculating means that calculates actual dimensions of an image of the photographic subject on the basis of a measurement of the distance measuring means and a measurement of the angle of inclination measuring means.

Cha, US 20050201638 discloses a method and a system of measuring an object in a two-dimensional digital image. The object is moved to cover the portion that is outside a viewing window, and a first image of the object, which is captured before the object is moved, and a second image of the object, which is captured after the object is moved are used in measuring. Displacement of the image is detected by comparing the position of one reference point of the object in the first image and the position of the same reference point of object in the second image. And the geometrical data of the object is calculated with the displacement data. The second image is overlapped with the first image by finding the position at which sum of the luminosity value of the first image and the reversed luminosity value of the second image is minimized.

Kishikawa, US 20050177350 discloses that when creating three-dimensional electronic map data, three-dimensional modeling of a building is performed as follows without measuring height of the building. Firstly, a building is photographed and the photographing position and photographing parameters (camera direction, angle of view) are recorded. Secondly, in a virtual space prepared on a computer, a photograph is arranged so as to reproduce the state upon the photographing according to this data. In combination with this, a plan view of the building is arranged according to the two-dimensional map data. Thirdly, the plan view is moved in the height direction until it is overlapped with the photograph, thereby modeling the building. Thus, it is possible to realize three-dimensional modeling without measuring the height.

Imai et al., US 20040179729 discloses a measurement system in which optimum measurement is conducted depending on an environmental change and movement of an object. The measurement system for measuring an object based on images obtained by plural cameras includes a positional control portion for controlling positions of the cameras to change photographing directions of the cameras, a two-dimensional measurement portion for conducting two-dimensional measurement of the object based on the image of the object, the image being obtained by at least one of the cameras, a stereoscopic measurement portion for conducting stereoscopic measurement of the object based on the images of the object, the images being obtained by the cameras, and a switching portion for switching between the two-dimensional measurement portion and the stereoscopic measurement portion to perform an operation.

Fay et al., US 20020093515 discloses a method for determining one or more dimensions of an object in a two-dimensional image, wherein the image includes the iris of a human being. A size ratio is estimated between the dimension of the object and the diameter of the visible iris, by analyzing the two-dimensional picture. Then, the dimension of the object is approximated based upon the size ratio and also based upon the invariant iris diameter. Use is made of the fact that the diameter of a human iris is substantially identical for all humans above the age of two, and thus an image which includes someone's iris furnishes a measuring device for determining other dimensions in the image. The present invention is especially suited for examining, virtually trying on, and purchasing eyewear from a remote location.

Faulk et al., U.S. Pat. No. 7,293,368 discloses an apparatus and method for accurately recording measurements of a window and producing accurate window treatments. A reference strip is provided having measurement indicia thereon, such as a checkerboard pattern of squares of predetermined sizes. The reference strip may be placed proximate a window and photographed. The size of the window may be accurately determined from the resulting photograph using the associated reference strip. The window may also be measured and the measurements stored as biographic data and associated with the photograph to form an accurate and verifiable window biography. The biography may be provided to another party, such as a treatment manufacturer, who verifies the measurements of the biographic data using photograph and produces a suitable window treatment according to the measurements.

Watanabe et al., U.S. Pat. No. 7,268,917 discloses an image correction processing apparatus for correcting a pixel value of each pixel constituting image data obtained from an original image affected by the peripheral light-off. The apparatus includes a pixel coordinate transforming unit for converting a distance between each pixel of a group of pixels which have an equal amount of peripheral light amount reduction and which are located on a common contour line of an oval about a predetermined reference pixel located at the center thereof and said predetermined reference pixel into a radius of a true circle having a diameter corresponding to the major axis of the oval; a cos.sup.4 calculating unit for obtaining, for each pixel, an angle value thereof in proportion to the radius obtained by the conversion and then obtaining a cos.sup.4 value of the angle value; and a correction calculating unit for multiplying an inverse of said cos.sup.4 value obtained for each pixel by a pixel value of this pixel, thereby to obtain a corrected pixel value for the pixel.

Anei, U.S. Pat. No. 7,269,281 discloses a method that can conduct accurate correspondence of images in measuring an object based on images obtained by plural cameras so that measurement of the object is conducted precisely. The method includes the steps of capturing plural images by plural cameras, using an image in a photographing area common to the images, ex. image information obtained from an area that is set as a specific area to set camera parameters, using the set camera parameters to photograph the same photographing areas as those when the camera parameters are set so as to capture images anew, the photographing being performed by the plural cameras, determining corresponding points in the newly captured images, and obtaining three-dimensional information of the object included in a photographing area.

Chang et al., U.S. Pat. No. 7,266,233 discloses an image measurement system and method for obtaining measurement data on objects by processing images of the objects. The image measurement system includes an image obtaining device for obtaining a first image of an object to be measured and a second image of a standard object, and a plurality of measurement computers linked to the image obtaining device via a communication network. The measurement computers are used for processing the first image and the second image to obtain measurement data on the object. Each of the measurement computers comprises an image obtaining module, an image processing module, and an image measuring module.

Kamon, U.S. Pat. No. 6,987,531 discloses an imaging system in which a two-dimensional photographing device and a unit for three-dimensional measurement are removably attached to each other. The system can be easily used for taking a two-dimensional image and for measuring three-dimensional data. The imaging system is used for conducting three-dimensional measurement of an object and taking a two-dimensional image of the object. The system includes a photographing device and a three-dimensional measurement auxiliary unit formed in a housing provided independently of the photographing device to be removably attached to the photographing device. The photographing device can take a two-dimensional image without the unit and can function as a light receiving portion in three-dimensional measurement to conduct three-dimensional measurement in cooperation with the attached three-dimensional measurement auxiliary unit.

Kamon et al., U.S. Pat. No. 6,975,361 discloses a system which is comprised of a two-dimensional photographing device and a three-dimensional measuring device that is removably attached to the two-dimensional photographing device. The two-dimensional photographing device and the three-dimensional measuring device can communicate with each other. Information indicating an operating condition of one of the devices is transmitted to the other device, which receives the information and sets own operating condition in accordance with the received information for photographing or measuring.

Nakayama, U.S. Pat. No. 6,768,813 discloses a photogrammetric image processing apparatus and method which defines a plurality of pairs of images, including a common target as belonging to the same groups (pairs). The apparatus provides an image display area and drawing area on the screen of the display device, displaying images of a pair on the image display area, calculating a valid mapping range for the pair, displaying an area marker showing the valid mapping range on the survey map superimposed in the drawing area, designating corresponding image points on the image of the pair to calculate the three-dimensional coordinates of physical points, and generating a survey map based on the three-dimensional coordinates.

Nakayama, U.S. Pat. No. 6,618,498 discloses an image processing computer system for a photogrammetric measurement in which a survey map is produced based on plural pictures under a three-dimensional coordinate system. A picture-arranging system rearranges the pictures to select plural pairs of pictures from among the pictures such that each pair of pictures is fixed to produce a survey map section. A picture-connecting system successively connects the plural pair pictures to each other. A monitor displays a scene including first and second display areas. The pairs of pictures are selectively displayed on the first display area, and a pair of object points corresponding to each other on two pictures in each pair are indicated. The coordinates of an object point represented by the pair of indicated object points are calculated, and the calculated coordinates on a plane defined by the coordinate system. The projected coordinates is displayed as a point representing said object point concerned on the second display area.

Watanabe et al., U.S. Pat. No. 6,097,850 discloses a method of measuring an unknown photographic parameter (distortion coefficient or focal length) from an image taken by a camera of which the photographic parameter is unknown. An image to be measured is entered, the photographic parameter to be measured (distortion coefficient or focal length) is designated, an image region necessary for measuring the photographic parameter in the image to be measured is designated, a characteristic relating to the photographic parameter to be measured is extracted from the designated image region, and the photographic parameter is calculated according to a specified operation processing on the basis of the quantity and position of the extracted characteristic.

Taylor et al., U.S. Pat. No. 5,967,979 discloses a remote wound assessment method and apparatus which includes forming an oblique image of a wound and a target plate containing a rectangle which is then placed near the wound. Using a novel method of determining vanishing points where photographic images of parallel lines on the target object intersect, coordinate transformations are calculated which map the oblique image of the rectangle into a normal image thereof. Using the same coordinate transformations, an oblique image of a wound adjacent to the target plate is mapped into a normal view thereof, allowing precise measurement of wound features. By forming two separate images of a wound and target plate at two different oblique inclinations, three dimensional features of a wound may be measured.

Ohashi et al., U.S. Pat. No. 5,910,817 discloses a method and apparatus for observing vehicles on a road or in a parking lot, the apparatus comprising a pair of cameras directed toward a predetermined observation position and simultaneously taking pictures. A characteristic portion in each of the respective pictures is extracted. The extracted characteristic portions of the respective pictures are corresponded to the pictures, and the corresponded characteristic portion is measured in three-dimensions to extract the three-dimensional coordinates of the characteristic portions. The three-dimensional coordinates of the extracted characteristic portions are projected on a virtual perpendicular plane, and the projected data is compared with pre-determined two dimensional model data to discriminate the object.

Yoshimi, JP 63214888 discloses an invention that measures the end position of an object accurately while excluding causes of error due to a change in lighting or the shape of the end by applying statistical processing to the picture edge.

The related art described above discloses several apparatus and methods for photographic based pictorial measurements. However, the prior art fails to disclose a simple system as described herein for quick and accurate measurements using a camera. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

There is a need for an inexpensive and highly portable equipment that enables the measurement of objects at a distance. One important use for such an invention is to measure the features on the exterior of a building without actually approaching the building. In the field of real estate sales one may wish, for example, to know the length of a balcony on the front of a building. If the balcony is inaccessible, it may be impossible to obtain an accurate measurement. From two or more measurements, one is able to determine the area of surfaces, as for instance the surface area of the exterior of a building when there is the need for calculating the amount of paint to purchase. On site measurements using standard tools such as tape measures or laser distance measures are useful to a point, but it is more convenient and efficient to be able to save information that can be referred to at a later time for measurements forgotten, overlooked, or not previously thought to be needed. The present invention provides the ability to easily, quickly and inexpensively obtain information concerning exterior or interior surfaces in a form enabling immediate determination of dimensions of any portion that is visible to a camera lens, and also enabling off-site reference for further measurements at a later time.

A camera is used to measure the linear dimensions of two points in a plane of interest. The camera is able also to measure the angle between trajectories to the two points. With this information, software is able to establish a measurement standard in units of length/pixel. This standard is then useful for finding any other linear dimension in a digitized photograph. The camera may be used to establish dimensions on-site, or the information may be wirelessly sent to an off-site computer work station for analysis. Such information may be archived in solid state or other memory devices for later reference. The camera is preferably mounted on a tripod, but less accurate results can be obtained when the camera is hand held and carefully manipulated.

A primary objective inherent in the above described apparatus and method of use is to provide advantages not taught by the prior art.

Another objective is to provide a camera that is able to take distance and angular data relative to objects in a photograph and to therefrom calculate a measurement standard;

A further objective is to provide a method for measuring any linear distances lying on a defined vertical plane from two distance measurements from a common point to the plane and an angular measurement between trajectories of the distance measurements.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Figure 1:
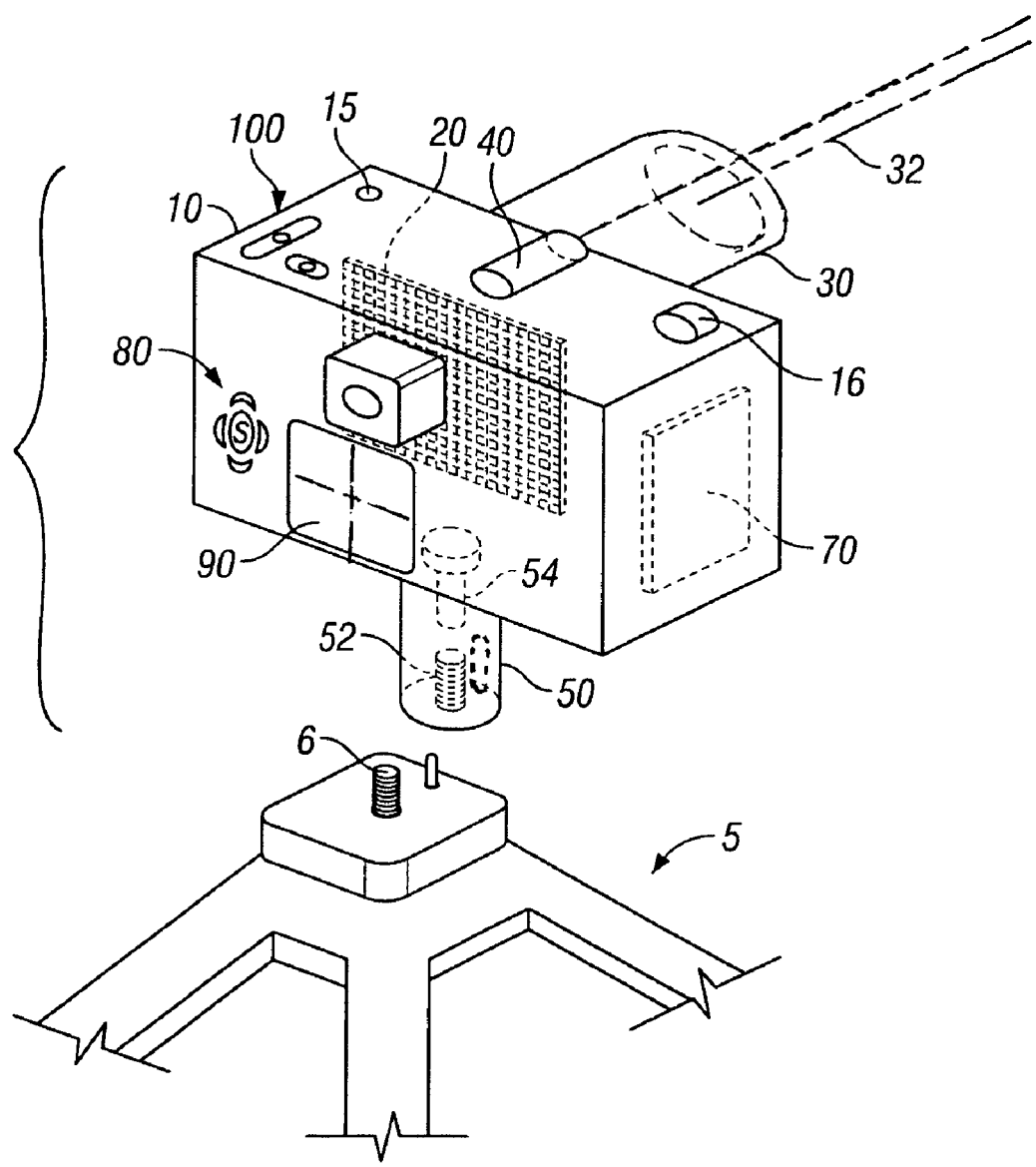
FIG. 1 is a perspective view of the presently described apparatus.

Referring to FIG. 1 we see that the present invention is a camera 10 which has a pixilated image receiver 20, and a telephoto lens 30, the lens enabled for alternately viewing a wide angle field of view and a narrow angle field of view. The lens 30 may also be continuously adjustable between the wide and narrow angles, and this is preferable. The telescopic range of the lens 30 is such that the wide angle field of view is large relative to the narrow angle field of view and preferably with a ratio of at least twelve to one (12:1) or greater. The camera 10 provides an active focusing means 40 also referred to as a focusing feature, enabled for measuring distances from the camera 10 to a distant object along the optical axis 32 of the lens 30 when the lens 30 is set at the narrow angle field of view so that the measured distance is associated with only a relatively small object or surface within the wide angle field of view. These distances are able to be retained in camera memory in an electronic form. Focusing means 40 measures distance to the subject independently of the optical system, and subsequently adjusts the optical system for correct focus. Systems, such as used in the present invention measure distance using ultrasonic sound waves or infrared light. In the first case, sound waves are emitted from the camera, and by measuring the delay in their reflection, distance to the subject is calculated. As an example, Polaroid cameras, including the Spectra and SX-70 are known for successfully applying this system. In the latter case, infrared light is usually used to triangulate the distance to the subject. Compact cameras including the Nikon 35TiQD and 28TiQD, the Canon AF35M, and the Cntax T2 and T3 use this system. Since these active focusing methods are well known in the field of the present invention, details of equipment and technique are not described here. Brower, U.S. Pat. No. 4,843,416 is incorporated by reference herein to describe the active automatic focusing technique used in the present invention, however, the present invention may also use other techniques as described in the literature, such as the technique described in U.S. Pat. No. 4,533,227 to Takahashi which is also incorporated herein by reference.

In the present invention, the camera 10 is positioned at a point "A" (see FIG. 2) and the distance from the camera 10 (point A) to each of two spaced apart objects located at points "B" and "C" are independently measured. Both points B and C are within the greater field of view, i.e., both are visible in the wide angle field of view of camera 10. These distances are recorded by the camera 10 as distance "x" and distance "y" respectively.

Camera 10 is mounted on a stand or tripod 5 wherein a camera element 50 is fixedly secured to the stand or tripod preferably on its standard camera mount which provides a threaded screw 6 engaged with camera element 50 in a threaded hole 52. Camera element 50 further includes an upwardly extending and vertically oriented shaft 54 which enters the camera body 10 from below. Shaft 54 is the rotating member of a rheostat 60, providing a variable voltage depending on the position of camera 10 with respect to the tripod or stand. Preferably, the shaft 54 is set to operate over 180° so that when the camera 10 is rotated to the extreme counter-clockwise attitude, a minimum voltage is provided by rheostat 60, and when camera 10 is rotated to its extreme clockwise attitude, a maximum voltage is provided. In use, the included angle, "a" (the angle associated with point A) is defined by rotation of camera 10 from an initial position wherein the optical axis of lens 30 is directed to point B, to a position wherein the optical axis of lens 30 is directed to point C. Angle a is generally not more than about 120° and is more usually in the range of 90°. Camera 10 encompasses a built-in microcomputer 70, a calculator feature, in the manner of most modern cameras and part of its operating firmware is an instruction set that enables a procedure for defining and recording angle a through this rotation of camera 10 and the concomitant change in the output voltage from rheostat 60. This may be referred to as an angle measuring feature of the camera. Angle a is therefore determined and held in memory in camera 10 in an electronic form. This procedure will be described below. Therefore, we see that camera 10 is able to measure and record the straight line distance from the camera 10 to each one of two points in its field of view. Also, camera 10 is able to measure and record the included angle between the two points as viewed by the camera 10. Camera 10 has the means for calculating the straight line distance between points B and C and for associating this distance, in feet and inches, to linear pixels as measured and calculated from the pixilated image receiver 20. Of course all other visually distinctive elements that appear in the field of view or a digital representation of a photographic image taken by camera 10, and which are roughly within or near a vertical plane defined by the straight line between points B and C, can therefore be calculated by merely counting linear pixels subtended by the elements. This is possible within camera 10 itself on site, or thereafter using a related application software on a desktop system. Clearly, it is desirable to be able to view an object from a distance and measure its features.

Figure 2:
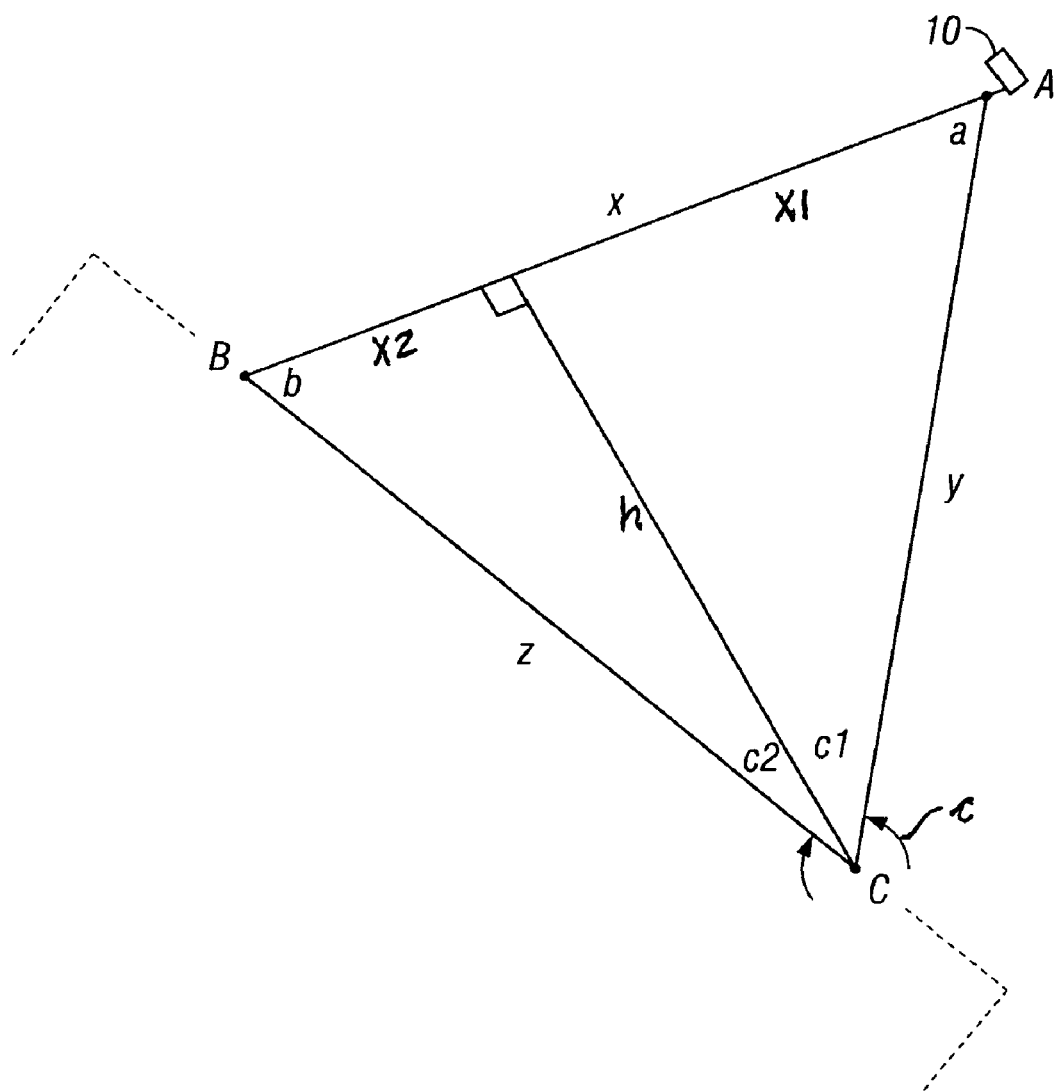
FIG. 2 is a plan view of a triangular virtual plane defined by points A, B and C where line B-C defines a vertical plane of interest in the inventive method.

Referring now to FIG. 2, we now described in detail the method of the present invention. First, camera 10 is placed at point A and is able to rotate in a horizontal plane so as to place optical axis 32 on points B and C. With, the optical axis 32 directed to point B along line x, button 15 is depressed thereby initializing a measurement sequence in microprocessor 70. Lens 30 is adjusted to an extreme narrow angle and button 15 is depressed a second time. Focusing means 40 measures and records distance x. Next, camera 10 is rotated through angle a so that optical axis 32 is directed to point C. For a third time, button 15 is depressed causing focusing means 40 to measure and record distance y and also record angle a as a voltage change between the positions B and C.

Button 15 is depressed a fourth time which signals the microcomputer 70 that measurements are complete. At this time microcomputer 70 calculates and records distance z, the straight line distance between points B and C. Length z lies in a virtual vertical plane that is used as a reference for comparative length determinations as will be described.

Next, with the optical axis positioned medially between points B and C, lens 30 is adjusted for a wide angle field of view that encompasses both points B and C and a digital photographic record of the field of view is made by using the picture taking shutter 16, thereby placing the image onto the pixilated image receiver 20. The microcomputer counts the number of pixels p that encompass the distance z and then forms the ratio of z/p (feet per pixels) and records this ratio defining a measurement standard. Once this standard is determined, the linear dimensions of all other objects in the digital photographic record are able to be determined simply by entering a start point and an end point in the photographic record and enabling the microcomputer 70 to count the corresponding pixels. To accomplish this on site, the camera 10 is fitted with a S-way button 80 well known in current devices, which functions as a joy-stick and selector. Button 80 provides left, right, up, and down, sections arranged around a central selector portion as shown in FIG. 1. With camera 10 displaying the photographic record on display 90, button 80 can be used to move a cursor on display 90 to a first position whereupon the central selector portion is depressed to set a first position on the displayed photographic record, and the cursor can be moved again to set a second position which immediately allows calculation and display of the linear dimension between the two positions. Thus camera 10 is able to photograph any scene and then display the linear dimensions of any object, or between any two points in the scene as long as the points are in the virtual plane.

Calculation of the dimension z is accomplished by the microcomputer 70 by a trigonometric method. Referring to FIG. 2 we consider the triangle A, B, C, a horizontal polygon when camera 10 is horizontal, which can be established by dual bubble levels 100. Therefore, the plane defined by the sweep of camera 10 between points B and C establishes a horizontal triangle A, B, C. Using the above described method, lengths x and y and angle a are directly measured. An altitude h is dropped from point C crossing x orthogonally. Next the length of h is determined by:

$h = y^* \sin a$ and, in angular degrees $a + c1 + 90 = 180$ so that $c1 = 90 - a$ now we know that $x1 = y \sin c1$ and therefore $x2 = x - x1$ now we know that $\tan c2 = x2/h$ and therefore $c2 = \arctan x2/h$ since $c = c1 + c2$ therefore we find $b = 180 - (a + c)$ now we know $x2^2 + h^2 = z^2$ so that $z = SQR(x2^2 + h^2)$ The length z is determined in the same linear units as lengths x and y, typically feet or meters. As described above z is also known in units of pixels so that the measurement standard is established.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A camera having a pixilated image receiver, the camera comprising:
    a telephoto lens enabled for alternately viewing a wide angle field of view and a narrow angle field of view, wherein the narrow angle field of view is small relative to the wide angle field of view;
    a focusing means enabled, when the telephoto lens is viewing the narrow angle field of view, for measuring individual distances from the telephoto lens to each of two spaced apart objects, wherein the objects are both visible in the wide angle field of view;
    a means for measuring a horizontal angle between the two objects;
    a means for calculating the straight line distance between the two objects using the individual distances of the two objects and the horizontal angle therebetween, the straight line distance defining a vertical plane;
    a means for converting the straight line distance to a pixel length equivalent; and
    a means for determining a length of all other objects in the defined vertical plane.

2. A camera having a pixilated image receiver, the camera comprising:
    a telephoto lens enabled for alternately viewing a wide angle field of view and a narrow angle field of view, wherein the narrow angle field of view is small relative to the wide angle field of view;
    a focusing feature of the camera enabled, when the telephoto lens is viewing the narrow angle field of view, for measuring individual distances from the telephoto lens to selected objects;
    an angle measuring feature of the camera enabled for measuring an angle between two selected objects, where the objects are simultaneously visible in the wide angle field of view;
    a calculator feature of the camera enabled for calculating the straight line distance between the two objects using measured individual distances of the two objects from the telephoto lens and the measured angle between the two objects;
    the calculator feature of the camera further enabled for converting the straight line distance to a pixel length equivalent; and
    the calculator feature of the camera further enabled for determining a length of a further object in a plane defined by the straight line distance.

3. A method for using a camera having a pixilated image receiver and a telephoto lens to measure the length of a distant object, the method comprising:
    enabling the telephoto lens for alternately viewing a wide angle field of view and a narrow angle field of view, wherein the narrow angle field of view is small relative to the wide angle field of view;
    measuring individual distances, in an electronic form, from the telephoto lens to two selected objects using a focusing feature of the camera when the telephoto lens is viewing the objects in the narrow angle field of view;
    measuring an angle, in an electronic form, between the two selected objects using an angle measuring feature of the camera when the selected objects are simultaneously visible in the wide angle field of view;
    calculating, in an electronic form, the straight line distance between the two objects using the measured individual distances of the two objects from the telephoto lens and the measured angle between the two objects using a calculator feature of the camera;
    converting the straight line distance to a pixel length equivalent using the calculator feature of the camera; and
    using the calculator feature of the camera, determining the length of the distant object, when the distant object is in a plane defined by the straight line distance.

4. A method for measuring a distant object, the method comprising:
    measuring individual distances from a camera lens to two selected objects using a focusing feature of the camera wherein the distances are in an electronic form;
    measuring an angle between the two selected objects using an angle measuring feature of the camera wherein the angle is in an electronic form; and
    using a calculator, calculating, in an electronic form, a straight line distance between the two objects using the electronic form of the measured individual distances of the two objects and the measured angle between the two objects and converting the electronic form of the straight line distance to a pixel length equivalent and determining the length of the distant object, when the distant object is in a plane defined by the straight line distance.

5. The method of claim 4 wherein the calculator is one of: an integral part of the camera, and enabled by a separate computer.

* * * * *